Feb. 16, 1971   D. W. DANIEL   3,563,076
SETUP METHOD FOR GEAR ROLLING
Filed Feb. 26, 1969   2 Sheets-Sheet 1

INVENTOR.
DAVID W. DANIEL
BY
ATTORNEYS

Feb. 16, 1971 D. W. DANIEL 3,563,076
SETUP METHOD FOR GEAR ROLLING
Filed Feb. 26, 1969
2 Sheets-Sheet 2
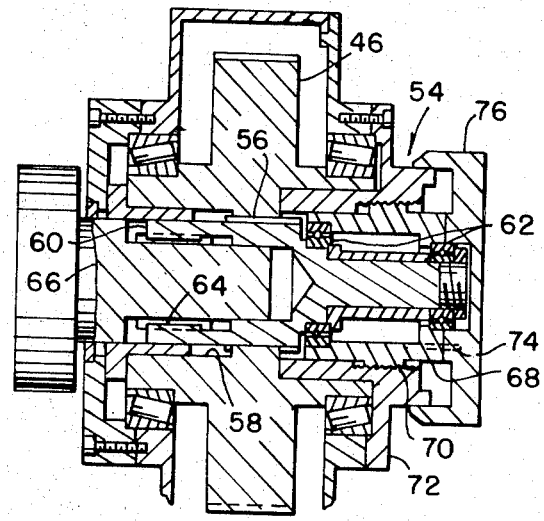
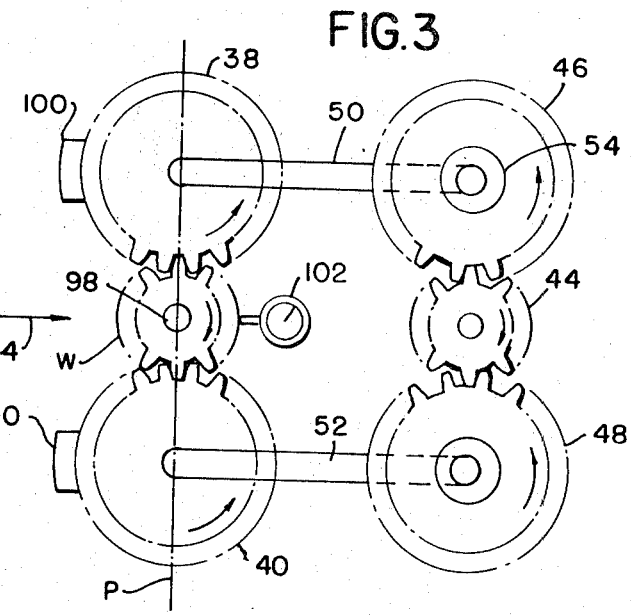
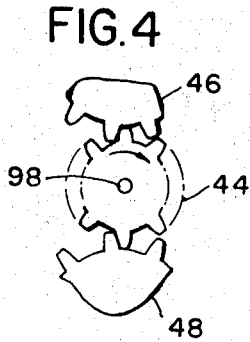
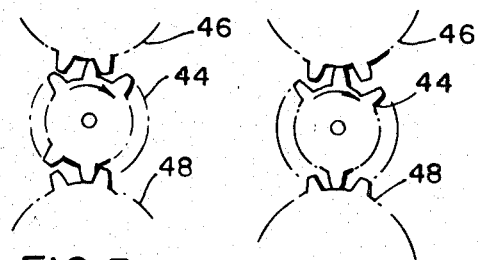
INVENTOR.
DAVID W. DANIEL
BY
ATTORNEYS United States Patent Office 3,563,076
Patented Feb. 16, 1971

3,563,076
SETUP METHOD FOR GEAR ROLLING
David W. Daniel, Birmingham, Mich., assignor to Lear Siegler, Inc., Santa Monica, Calif., a corporation of Delaware
Filed Feb. 26, 1969, Ser. No. 802,339
Int. Cl. B21h 5/00
U.S. Cl. 72—108                                                7 Claims

ABSTRACT OF THE DISCLOSURE

Method of setting up gear rolling apparatus using a plurality, preferably two, opposed roll dies driven in a single direction by a gear train, including an input drive gear, interconnecting said dies. A work gear centered on an arbor between the dies is brought into tight mesh with the dies, establishing backlash between one or more gears in the gear train connecting the dies. The arbor is removed, and the input drive gear is rotated slowly in the direction in which it will rotate during gear rolling. Rotation of the dies is opposed by brake action. If the timing of the gears in the gear train is not correct, the work gear will shift laterally of the line joining the axes of said dies in one direction or the other. One of the dies is then angularly adjusted relative to the other die through appropriate gear train adjustment until the work gear is again central, thus establishing the correct timing relationship.

CROSS-REFERENCE TO RELATED APPLICATION

This application may be considered as related to copending application of Bregi et al., Ser. No. 762,898, filed Sept. 26, 1968, assigned to assignee hereof.

BRIEF SUMMARY OF THE INVENTION

A gear rolling operation is carried out at present by driving a pair of gear-like roll dies in timed relation in mesh at diagrammatically opposite sides of a work gear or blank and effecting a relative radial infeed of the dies to form gear teeth on the blank or to finish the tooth surfaces of previously formed teeth. The work piece is supported on an arbor which maintains it in mid-position between the rolling dies. The arbor which supports the work piece is not positively geared to rotate in timed relation to the dies but its rotation is the result of the engagement between the work piece and the rolling dies.

It is a requirement for best results that the rolling dies be positioned in accurately timed relation with respect to each other. Apparatus is available for effecting small angular adjustment of one of the dies relative to drive gearing with which it is associated and this equipment permits effecting such adjustment while the dies are being rotated.

In accordance with the present invention a work blank is accurately positioned midway between the opposed roll dies. Relative movement between the work piece and the dies is accomplished to bring the teeth of the dies into tight mesh with the teeth of the work piece. The gearing which drives the individual roll dies includes some backlash and when the dies are brought into tight mesh with the work gear, preferably while the work gear and dies are not rotating, the gears which connect the roll dies to a single input gear assume a condition of loose mesh depending upon the timed relation between the roll dies.

The position of the work gear with respect to lateral displacement from a plane containing the axes of the roll dies is accurately gauged. Thereafter, the arbor is removed from the work gear or is rendered ineffective to prevent displacement of the work gear laterally of the aforesaid plane. Brake means are applied to the roll dies. The input gear is then rotated in the direction in which it will rotate continuously during subsequent gear rolling operations until all backlash is taken out of the gear train connecting the roll dies.

If the roll dies are not in precisely accurately timed relation, the rotation of the input drive gear will result in lateral displacement in one direction or the other of the work gear from the aforesaid plane containing the axes of the roll dies. Thereafter, one of the dies is angularly adjusted with respect to its driving gear train so as to bring the work gear back of the proper intermediate position in which its axis occupies the aforesaid plane. At that time the arbor may be re-inserted or its operation re-established to maintain the gear in proper centered relation between the dies.

This operation is a setup operation which is necessary only on initial setup. Thereafter, a multiplicity of work gears may be passed through the gear rolling equipment without the necessity for further adjustment.

BRIEF DESCRIPTION OF THE DRAWINGS

FIG. 2 is an enlargement of the timing adjustment shown in section in FIG. 1.

FIG. 3 is a diagrammatic view illustrating the meshing relationship between the teeth of drive gearing, the roll dies and the work piece.

FIGS. 4, 5 and 6 are fragmentary diagrammatic views illustrating different meshed relationships which may occur.

DETAILED DESCRIPTION

Figure 1:
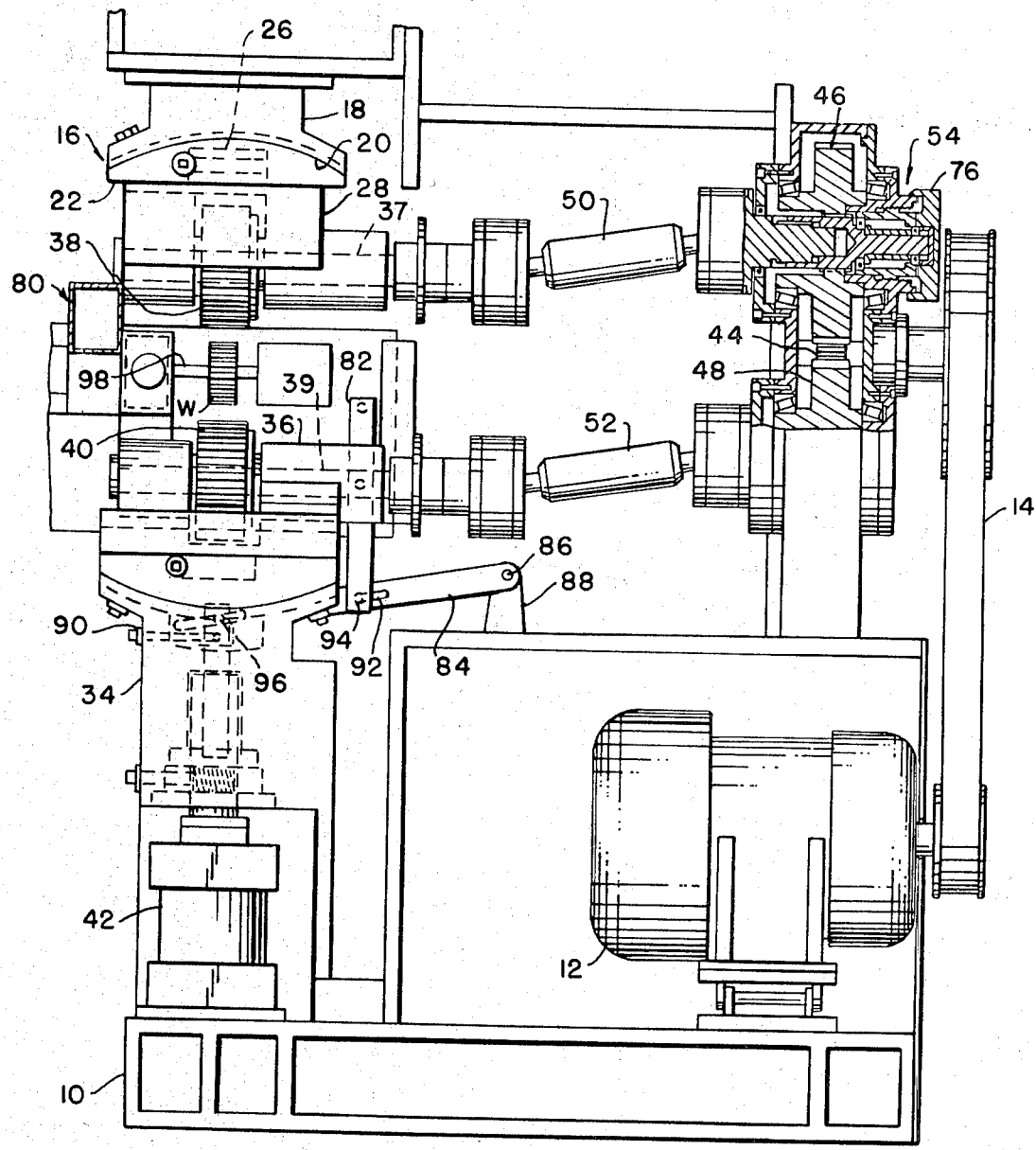
FIG. 1 is an elevational view, partly in section, of gear rolling equipment of the type referred to herein.

While the present invention may be practiced with gear rolling machines of widely different types, it is herein illustrated, for convenience, with the type of gear rolling machine illustrated and described in Bregi et al. application Ser. No. 762,898, assigned to assignee hereof.

As best seen in FIG. 1, this machine comprises a frame 10 having adjacent the bottom thereof a drive motor 12 connected through a belt 14 to drive gearing connected to the rolling dies as will presently be described.

Adjacent the top of the frame 10 is an upper die support indicated generally at 16 including a bracket 18 which has a curved under-surface 20 adapted to receive a bracket 22 for angular adjustment about a horizontal axis located at the center of curvature of the guide surface 20. This center of curvature, as is apparent from the drawing, is located closely adjacent the axis of the work piece W. This construction provides for angular adjustment of the upper die about a horizontal axis which is perpendicular to the axis of the upper die.

Means are also provided for effecting a swivelling adjustment of the upper die roll about a vertical axis and this means comprises a post 26 on the upper spindle support 28. Suitable means are provided for clamping the spindle support 28 to the member 22 in adjusted position and for clamping the member 22 to the bracket 18 in adjusted position.

Equivalent structure is provided on a vertically movable ram 34 for effecting the necessary adjustment of the lower spindle support 36. The upper stationary die roll support includes a shaft 37 for supporting the upper die roll 38. Similarly, the lower vertically movable die roll support includes a shaft 39 for supporting the lower die roll 40.

The upper die roll, once its position has been adjusted in a preliminary setup, remains stationary except for rotation imparted thereto. However, the lower die roll 40 is vertically movable upon upward movement of the ram 34, this movement being imparted by a piston and cylinder construction 42 adapted to apply relatively massive pressure to the work piece W interposed between the die rolls 38 and 40.

Means are provided for driving the die rolls 38 and 40 in rotation and these means comprise an intermediate input drive gear 44 in mesh with gears 46 and 48 which are connected respectively through universal drive connections 50 and 52 to the spindles supporting the die rolls 38 and 40.

Special means, indicated generally at 54 and shown in enlarged view FIG. 2, are provided for effecting a timing adjustment between the die rolls 38 and 40. For this purpose the upper drive gear 46 has a central opening therethrough and includes a spline section at 56. Received within the opening 58 in the gear 46 is a timing sleeve 60 supported for rotation in bearings 62, the sleeve having an external spline at 56 coacting with the internal spline in the gear 46. The sleeve 60 is provided at 64 with an internal spline coacting with an external spline formed on the drive shaft 66. It will be understood that the splines at 56 and 64 are of different angles. For example, one set of cooperating splines may be spur type while the other may be helical. The sleeve 60 is axially adjustable by virtue of its connection to an adjusting sleeve 68 which is externally threaded as indicated at 70 for coaction with threads provided at the interior of a stationary support member 72. The adjusting sleeve 68 is connected by a pin 74 to an adjusting knob 76.

It will be apparent that angular adjustment may be effected between the gear 46 and the shaft 66 during rotation of these parts by adjustment of the knob 76 which remains stationary during rotation of the gear and shaft. Manual rotation of the knob 76 effects longitudinal adjustment of the sleeve 60 and the timing adjustment is provided by virtue of the different angular disposition of the sets of splines.

The work supporting structure includes means for effecting automatic loading and unloading and also includes a non-positive drive means for rotating the work piece at a speed somewhat different than the speed at which the work piece will be driven by its engagement with the die rolls 38 and 40. This entire work supporting structure including the automatic loading mechanism, is vertically movable and its vertical movement is related to the vertical movement of the ram 34. For this purpose the entire work support structure illustrated generally at 80 is connected by means of a post 82 to an actuating arm 84 pivoted as indicated at 86 to a post 88 on frame 10. The arm 84 is slotted as indicated at 90 and 92. The post 82 carries a pin 94 which enters the slot 92 and effects vertical movement of the work supporting structure as the arm 84 is rocked. The arm 84 is rocked by means of a pin 96 carried by the ram 34 and movable in the slot 90 provided adjacent the movable end of the arm 84. Since the spacing of the pin 96 from the pivot mounting 86 is twice that of the pin 94, it will be apparent that vertical movement of the lower roll 40 be accompanied by vertical movement of the work piece W in an amount exactly half the movement of the roll 40.

In operation the axis of the arbor 98 on which the work piece is mounted occupies a vertical plane which contains the axes of the rolls 38 and 40.

Referring now to FIG. 3 there is diagrammatically illustrated the relationship between the upper die roll 38, the lower die roll 40, the work piece W, the gear 46, the gear 48, and the common input drive gear 44. Also indicated in this figure is the timing adjustment means 54.

Upon initial setup involving the placement of rolls 38 and 40 on their arbors, and the timing, it is necessary to effect timing adjustment between the gears and rolls. This timing adjustment involves essentially manipulation of the standard parts of the gear rolling apparatus as previously described, except for the provision of brakes 100 which are adapted to oppose rotation of the die rolls 38 and 40 although permitting rotation thereof upon attainment of sufficient torque.

The setup operation involves placing a work piece W on the spindle or arbor 98 and the relative movement between the work piece and die rolls such as to insure tight mesh between both of the die rolls 38 and 40 with the work gear W. This is accomplished while the input drive pinion 44 is not driven.

It may be noted that appreciable backlash is provided between the teeth of the pinion 44 and gears 46 and 48. Accordingly, as the teeth of the work gear W come into tight mesh with teeth on both of the roll dies 38 and 40, the gears 46 and 48 will be positioned in accordance with the tight meshed condition between the roll dies and work gear. Therefore, except under the accidental initial attainment of perfect timing, the teeth of one or both of the gears 46 and 48 will move into a floating condition with respect to the teeth of the input drive pinion 44.

At this time, by suitable indicator means diagrammatically represented at 102, the transverse location of the work piece W is noted. At this time the axis of the work piece occupies the vertical plane P extending through the axes of the rolls 38 and 40.

With the parts in this relationship and wtih the teeth of the input drive gear 44 in a random position of loose mesh with respect to the teeth of the transmission gears 46 and 48, as diagrammatically suggested in exaggerated fashion in FIG. 3, the arbor 98 is withdrawn or otherwise caused to assume a condition in which it permits transverse movement of the gear W in either direction indicated by the double headed arrow 104. For example, instead of completely withdrawing the arbor 98, an arbor may be employed having radially movable locating abutments which may be withdrawn radially inwardly to permit limited transverse movement of the work gear relative to the arbor.

With the work gear now movable horizontally in either direction as indicated by the arrow 104, the setup man rotates the input drive gear 44 slowly in the single direction in which this drive gear will rotate during continued gear rolling operations. Obviously, the initial rotation of the drive gear 44, assuming its teeth are not in contact with any teeth of either transmission gear 46 or 48 is to rotate it to a position in which the teeth at one side thereof will make contact with the teeth of either the gear 46 or 48. Only in the unlikely and accidental situation where the initial setup happens to be perfect as to timing will simultaneous metal-to-metal contact take place between the teeth of the input drive gear 44 and the transmission gears 36 and 48.

After contact has been made with the teeth of one of the gears 46 or 48, continued rotation of the input drive gear 44 will effect rotation of that transmission gear and through the coupling 50 or 52 it will effect, a corresponding rotational movement of the gear roll 38 or 40 connected thereto. At this time the other or remaining roll gear will not rotate so that rotation of one roll gear taking place while the other roll gear is retained in a stationary condition by the brake 100, will of course result in transverse movement of the work gear W. This movement will of course appear on the dial of the indicator 102. At this time suitable adjustment may be made in the appropriate direction of the knob 76 of the timing adjusting device to effect a timing adjustment which will bring the work gear back to the exact central position in which its axis again occupies the plane P. To be sure that this adjustment is correct it is desirable to observe possible displacement during continued rotation of the gears, gear rolls, and work piece by rotating the input drive gear 44. When it has been assured that the correct timing between the rolls 38 and 40 has been obtained while the teeth of the drive gears 46 and 48 are in solid metal-to-metal contact with the teeth of the input drive pinion 4 while the drive pinion is rotating in the proper direction, the arbor may be replaced or re-activated and proper setup of the gear rolling equipment accomplished.

A number of possible conditions between the teeth of the input drive pinion or gear 44 and the transmission gears 46 and 48 ae illustated in FIGS. 4, 5 and 6.

Referring first to FIG. 4, it will be observed that, assuming the direction of rotation illustrated by the arrows, further rotation of the input pinion will immediately effect rotation of the gear 48 and hence of the roll die 40 against the action of the brake 100. However, at this time the teeth cooperating with the teeth of the gear 46 will move across the tooth space so that the gear 46 will remain stationary until the illustrated backlash has been eliminated. This will of course result in displacement of the work gear W to the left as seen in FIG. 3.

In FIG. 5 there is illustrated a condition in which the teeth of the input gear, assuming the illustrated direction of rotation, are in contact with the teeth of the gear 46 so that initial rotation of the input pinion will result in rotation of the gear 46 in the direction indicated. At the same time the backlash existing between the teeth of the input pinion 44 and the gear 48 will insure that the initial rotation of the input pinion does not result in rotation of the gear 48 nor of the die roll 40 connected thereto. Accordingly, under these circumstances, the rotation of the input pinion 44 will result in displacement of the work gear W to the right as seen in FIG. 3.

In FIG. 6 there is illustrated a condition in which the teeth of the input pinion 44 have equal clearance at both sides with respect to the teeth of the gears 46 and 48. This is a condition of correct timing. Initial rotation of the input pinion 44 will initiate equal and opposite rotation of the gears 46 and 48, and hence of the roll gears 38 and 40 simultaneously so that no lateral displacement of the work gear W will occur.

The drawings and the foregoing specification constitute a description of the improved setup method for gear rolling in such full, clear, concise and exact terms as to enable any person skilled in the art to practice the invention, the scope of which is indicated by the appended claims.

What I claim as my invention is:

1. The method of setting up gear rolling apparatus comprising a pair of roll dies engageable with an interposed work gear, the roll dies being connected to gearing including a common input drive gear, and timing adjustment means being provided intermediate one of the rolls and the input drive gear, which comprises:
   supporting a work gear on an arbor intermediate the die rolls with the axis of the work gear occupying the plane passing through the axes of the die rolls, indicating the location of the work gear with reference to movement transversely of the plane,
   relatively moving the die rolls and work gear to bring about a condition of tight mesh between the teeth of each of the die rolls and the teeth of the work gear,
   providing for lateral displacement of the work gear transversely with repect to said plane,
   effecting slow rotation of the input drive gear in the single direction in which it will rotate during succeeding gear rolling operations to take up backlash in the gearing,
   observing lateral displacement of the work gear, and effecting a timing adjustment between one of the gears and the input drive gear sufficient to restore the work gear to a position in which its axis contains the plane passing through the axes of the die rolls,
   and finally restoring support of the work gear by the arbor while the axes of the work gear and arbor both coincide and occupy the plane containing the axes of both roll dies.

2. The method as defined in claim 1 in which the step of providing for lateral displacement of the work gear comprises withdrawing the arbor from the work gear.

3. The method as defined in claim 1 in which the step of providing for lateral displacement of the work gear comprises effecting an adjustment of the arbor which permits lateral motion of the work gear relative thereto without removing the arbor from the work gear.

4. The method as defined in claim 1 which comprises employing a master gear of extreme accuracy as the work gear during initial setup.

5. The method as defined in claim 1 which comprises effecting timing adjustment between the roll dies while effecting rotation of the input drive gear.

6. The method of setting up gear rolling apparatus as defined in claim 5 which comprises effecting the timing adjustment during continuous slow rotation of the input drive gear in its driving rotation.

7. The method as defined in claim 5 which comprises effecting the timing adjustment of the roll dies after having eliminated backlash in the gearing by limited rotation of the input drive gear, and thereafter checking accuracy of timing adjustment by effecting a multiplicity of incremental partial rotations of the roll dies and observing the accuracy of the timing adjustment and if necessary, effecting a re-adjustment to provide accurate average adjustment thereof.

References Cited

UNITED STATES PATENTS

| | | | |
|---|---|---|---|
| 2,883,894 | 4/1959 | Tsuchikawa | 72—105 |
| 3,362,059 | 1/1968 | Di Ponio, et al. | 29—159.2 |

LOWELL A. LARSON, Primary Examiner

U.S. Cl. X.R.

72—195